United States Patent [19]

Swartz

[11] Patent Number: 4,463,274

[45] Date of Patent: Jul. 31, 1984

[54] TEMPERATURE COMPENSATION CIRCUIT FOR PRESSURE SENSOR

[75] Inventor: Craig Swartz, Tempe, Ariz.

[73] Assignee: Motorola, Inc., Schaumburg, Ill.

[21] Appl. No.: 344,900

[22] Filed: Feb. 1, 1982

[51] Int. Cl.³ .................. H03K 17/90; G06G 7/12
[52] U.S. Cl. ............................. 307/491; 307/309; 307/490; 328/3
[58] Field of Search .......... 307/309, 310, 490, 491; 328/3

[56] References Cited

U.S. PATENT DOCUMENTS 4,052,677 10/1977 Hogan ........................... 307/494
4,080,075 3/1978 Berg ............................. 307/494
4,352,053 9/1982 Oguchi et al. .................. 307/310

Primary Examiner—Stanley D. Miller
Assistant Examiner—B. P. Davis
Attorney, Agent, or Firm—William E. Koch

[57] ABSTRACT

A circuit is disclosed for temperature compensating the output voltage thereof with respect to undesireable temperature induced signals from a pressure transducer and/or the circuit itself. The circuit comprises a pressure transducer, two operational amplifier stages, and an output stage. One operational amplifier is coupled between the pressure transducer and a summing node. Two compensation networks, one each coupled between the pressure transducer excitation input terminals and two voltage source terminals, nulls temperature induced voltages at the summing node.

10 Claims, 2 Drawing Figures

TEMPERATURE COMPENSATION CIRCUIT FOR PRESSURE SENSOR

BACKGROUND OF THE INVENTION

1. Field of the Invention

This invention relates to pressure sensor amplifier circuits and more particularly to circuitry having thermistors which compensates for voltage shifts in the output of a pressure transducer due to changes in temperature.

2. Background Art

Modern automobile engine control systems presently require pressure responsive transducers in circuitry for engine management. Some such systems utilize manifold pressure transducers in amplifier circuits which provide an analog control signal which is a function of the engine manifold pressure. An analog-to-digital converter transforms the analog control signal into a digital control signal which is utilized by a microprocessor, for example, to control fuel injection.

Unfortunately, most semiconductor pressure transducers have undesirable temperature characteristics which are different for different transducers. Offset voltage, which is the differential output voltage of the transducers at zero pressure, not only varies in magnitude for different transducers, but also varies with temperature change. Also, the temperature coefficient of "span" or change in voltage output verses change in pressure typically has a negative value, the range of values varying for both different transducers and changes in temperature.

One known configuration for temperature compensation of span is a temperature compensation circuit that utilizes a plurality of thermistors which vary the magnitude of the excitation voltage across the transducer to compensate for the undesirable changes in sensitivity with temperature. The pressure transducer is basically a bridge circuit and the thermistors are connected from each input terminal of the bridge to a power supply line. The thermistors change the excitation voltage level so that the output voltage across the terminals of the bridge remain constant for a given change in pressure even though the temperature changes. The thermistors have been shunted with temperature stable elements such as resistors to tailor the compensation characteristic. The combination of resistors, thermistors, and transducer has been adjusted by laser trimming through iterative operations over temperature to provide a composite device having a desired degree of temperature independence. These adjustments include sequential measurements over temperature and trimming. These elements can also be trimmed to compensate for the undesired temperature dependence of the transducer offset voltage.

Another known configuration requires the insertion of jumpers or connecting wires to complete parts of the circuit. The circuit must be tested with each individual transducer to determine whether the temperature coefficient of offset is positive or negative and then a jumper inserted to have the circuit compensate appropriately. The inclusion of jumpers results in a major cost increase. Furthermore, the procedure for inserting the jumpers induces inaccuracies into the circuits. The jumper insertion device picks up radio frequency interference from the laser used for trimming the resistors and typically induces up to 30 millivolts into the output of the circuit.

The above known configurations also require a complex procedure for trimming the resistors. The gain of the circuit and the offset voltage of the transducer interact, requiring different pressures for setting both.

Thus, the need exists for a temperature compensating pressure sensor amplifier circuit that does not have jumpers and wherein gain and transducer offset do not interact thereby simplifying the resistor trimming procedure.

SUMMARY OF THE INVENTION

Accordingly, it is an object of this invention to provide an improved temperature compensation circuit for pressure sensors.

A further object of this invention is to provide an improved circuit that compensates a pressure transducer for temperature changes without having a requirement for inserting jumpers to accommodate the characteristics of circuit elements.

Yet another object of this invention is to provide an improved temperature compensation circuit for pressure sensors that simplifies the resistor trimming procedure by reducing the settings required at different pressures.

In carrying out the above and other objects of the invention in one form, there is provided an improved circuit for temperature compensating a pressure transducer having a compensating means including a first and a second thermistor, a circuit means including a first and a second operational amplifier, and an output means. The first and second thermistor are coupled, respectively, to the high and low side of a voltage source and provide a first and second signal to the sensor. The first operational amplifier is responsive to the pressure transducer and sums its output with the first and second signal in order to drive the second operational amplifier. The output means is responsive to the second operational amplifier.

The above and other objects, features, and advantages of the present invention will be better understood from the following detailed description taken in conjunction with the accompanying drawings.

DETAILED DESCRIPTION OF THE INVENTION

Figure 1:
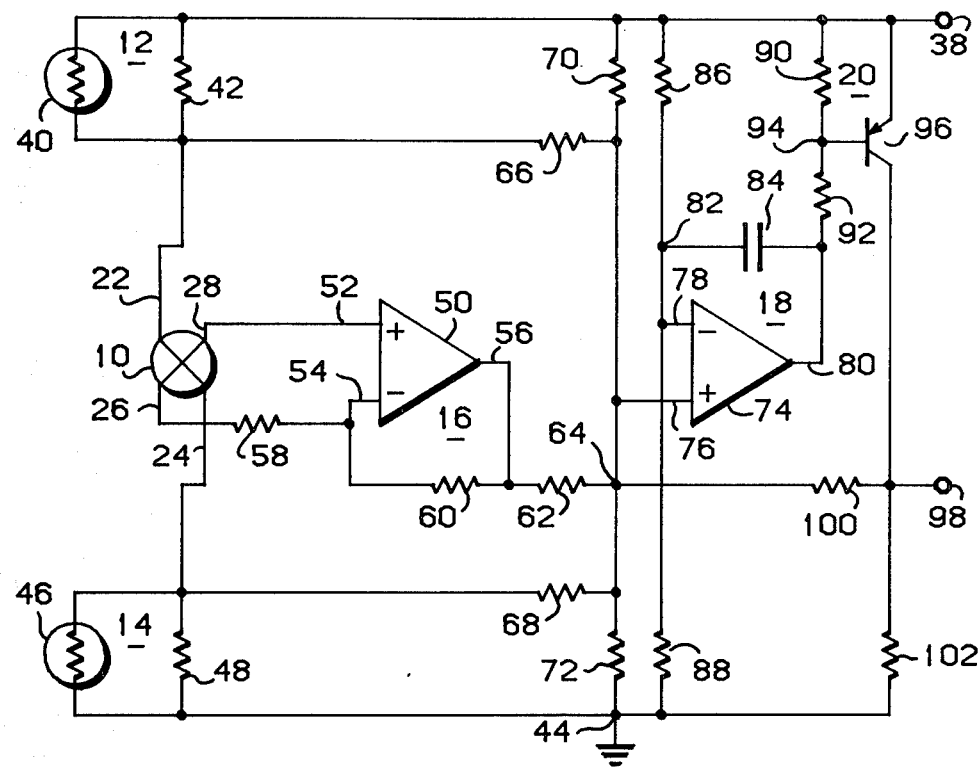
FIG. 1 is a schematic of a first embodiment of the invention.

FIG. 1 illustrates in schematic form a temperature compensation amplifier circuit for pressure sensors having a pressure transducer 10, a first and second span temperature compensation network 12 and 14, a first and second amplifier stage 16 and 18, and an output stage 20. The pressure transducer 10 is typically a piezoresistive pressure sensing element having excitation terminals 22 and 24 and a positive and a negative output terminal 26 and 28, respectively. The pressure transducer 10 may be, for example, a single resistor having taps on four sides, such as Motorola's MPX-100, or a bridge circuit having four resistive elements. First temperature compensation network 12 is coupled between positive power supply conductor 38 and terminal 22. First temperature compensation network 12 comprises thermistor 40 and resistor 42 in parallel. Second temperature compensation network 14 is coupled between ground conductor 44 and terminal 24. Second temperature compensation network 14 comprises thermistor 46 and resistor 48 in parallel.

Under quiescent or zero pressure conditions, differential output terminals 26 and 28 are biased to have in the range of 0–30 millivolts thereacross for the typical case where positive power supply conductor 38 has 5.1 volts applied thereto and approximately 4.3 volts and 0.8 volts at terminals 22 and 24, respectively. As pressure is applied to transducer 10, the magnitude of the voltage at the positive output terminal 26 tends to increase and the magnitude of the voltage at negative output terminal 28 tends to decrease thereby creating a differential output voltage therebetween. Unfortunately, the sensitivity or span of transducer 10 tends to decrease with increase in temperature. This means that as the temperature increases a given change in pressure on transducer 10 will produce less differential voltage between terminal 26 and 28. The differential signal change typically increases to between 90 and 120 millivolts for a change in pressure of 600 torr. This change in differential voltage due to pressure is nearly linear over the pressure range of interest.

Pressure transducers can be of various types by way of their construction or design. Different types of transducers 10 can have different negative coefficients of span. Thus, thermistors 40 and 46 and resistors 42 and 48 must be adjusted for each type of transducer to compensate for the change in span with temperature by adjusting the magnitude of the excitation voltage at terminals 22 and 24 with temperature which affects the differential output voltage between terminals 26 and 28. For transducers of the same type the span can be compensated over a temperature range of between −40° C. to 125° C. to provide a variation in transducer output voltage at any pressure of interest with an accuracy of 1.5 percent of full scale between 0° C. and 85° C. and 2-3 percent above 85° C. and below 0° C.

Since the resistance of networks 12 and 14 tends to decrease with increasing temperature, the voltage across terminals 22 and 24 tends to increase to compensate the resistance decrease across pressure transducer 10. This allows the voltage at terminals 26 and 28 to remain constant with respect to ground conductor 44.

Networks 12 and 14 are trimmed by first pre-trimming thermistors 40 and 46 to a fixed resistance. Resistors 42 and 48 may also be pretrimmed. Voltage is applied across nodes 38 and 44 and the resistance of transducer 10 calculated. Knowing this resistance allows for the accurate determination of the voltage needed across transducer 10 for optimum span compensation. Next, resistor 42 is trimmed by laser for the proper voltage at terminal 22. Then resistor 48 is trimmed to provide the proper voltage at terminal 24. However, this trimming affects the voltage at terminal 22, therefore, the two trimming steps are repeated, bringing the voltage drop across temperature compensation networks 12 and 14 to within one percent of one another.

First amplifier stage 16 includes operational amplifier 50 which has a non-inverting input terminal 52, an inverting input terminal 54, and an output terminal 56. Non-inverting input terminal 52 is connected to terminal 28 of pressure transducer 10. Resistor 58 is coupled between inverting input terminal 54 and terminal 26 of pressure transducer 10. A feedback resistor 60 is coupled between output terminal 56 and inverting input terminal 54. Resistor 62 is coupled between output terminal 56 and node 64. Resistors 66 and 68 are coupled between node 64 and terminals 22 and 24, respectively. Resistors 70 and 72 are coupled between node 64 and conductors 38 and 44, respectively. Resistors 66 and 68 provide a path to node 64 for summing the voltages at terminals 22 and 24, respectively, with the output with first amplifier stage 16.

Second amplifier stage 18 includes operational amplifier 74 having a non-inverting input terminal 76 connected to node 64. An inverting input terminal 78 is connected to node 82. Capacitor 84 is coupled between output terminal 80 and node 82. Resistors 86 and 88 are coupled between node 82 and conductors 38 and 44, respectively.

In operation, as pressure is applied to pressure transducer 10, the common mode voltage at terminal 26 increases and the common mode voltage at terminal 28 decreases. Amplifier 50 responds to the decreasing potential at terminal 52 by providing a decreasing potential at output terminal 56 which causes current to flow through 62 to non-inverting input terminal 76. Amplifier 74 responds to the current flow through resistor 62 and the increasing potential at terminal 76 by decreasing potential at output terminal 80. Output stage 20 inverts the decreasing signal at terminal 80 to provide an increasing potential at circuit output terminal 98. The amplifier 74 continues to control the potential at terminal 98 through output stage 20 until the voltage at nodes 64 and 82 are the same. Such behavior is well understood by those skilled in the art of operational amplifier design.

The initial offset voltage of transducer 10 is the differential voltage between terminals 26 and 28 with no pressure applied to the transducer. Negative offset, for example, means that the common mode voltage at terminal 28 is greater than the common mode voltage at terminal 26. Offset is caused by imperfect alignment of the taps for a single resistor pressure transducer 10 or the unequal resistance of the four resistive elements of a bridge circuit pressure transducer 10.

The voltage increases at output terminal 28 and decreases at output terminal 26 with increasing temperatures. If resistors 66 and 68 are equal, the temperature coefficient of offset is zero, since it is the sum of two equal and opposite signals. However, by trimming resistors 66 and 68 so they are no longer equal, the resultant signal can be made to have either a positive or negative temperature coefficient of the proper magnitude to cancel out the temperature coefficient of offset supplied from operational amplifier 50.

Output stage 20 includes a voltage divider having resistors 90 and 92 coupled between conductor 38 and the output terminal 80 of operational amplifier 74. Node 94 between these resistors is connected to the base of PNP driver transistor 96 which has an emitter connected to conductor 38 and a collector connected to circuit output terminal 98. Resistors 100 and 102 are coupled between circuit output terminal 98, and node 64 and conductor 44, respectively.

Standard operational amplifier 74 is internally limited by the design thereof so that it cannot drive output terminal 80 to voltage magnitudes approaching the supply potential magnitude on conductor 38. Output stage 20 amplifies the output signal of amplifier 74 so that circuit output terminal 98 can be driven to potentials approaching the supply potential on conductor 38. Resistors 90 and 92 enable amplifier 74 to remain in its active region. As amplifier 74 drives the magnitude of the voltage at output terminal 80 up and down, a control voltage is provided at node 94 which is amplified by transistor 96 which swings the output voltage at terminal 98 from near the negative or ground potential on conductor 44 to near the magnitude of the voltage on positive conductor 38. Resistor 102 is required to provide a path for current to the negative conductor 44 when transistor 96 is not conducting current from positive conductor 38.

Output stage 20 provides a signal inversion, which necessitates input terminals 76 and 78 of operational amplifier 74 to be reversed as compared to the typical connection of operational amplifier 74 as an inverting amplifier. Resistors 60 and 62 can also be trimmed so that amplifier 50 provides a desired amount of voltage gain.

Capacitor 84, which is coupled between inverting input terminal 78 and output terminal 80, tends to stabilize the output of operational amplifier 74 by providing a larger feedback as the frequency increases.

The circuit described herein enables the use of resistors having low temperature coefficient of resistance which facilitates implementation in hybrid form. The following table is provided only by way of example and shows typical values.

| Resistors | Resistance in Thousands of Ohms |
| --- | --- |
| 42 | .2 |
| 48 | .2 |
| 58 | 4 |
| 60 | 60 |
| 62 | 4 |
| 66 | 10 |
| 68 | 10 |
| 70 | 10 |
| 72 | 10 |
| 86 | 9 |
| 88 | 10 |
| 90 | 12 |
| 92 | 20 |
| 100 | 40 |
| 102 | 2 |

Transducer 10 can have a resistance of about 400 ohms. Thermistors 40 and 46 can have a $\beta$ of about 1250 and a resistance of 500–700 ohms.

Figure 2:
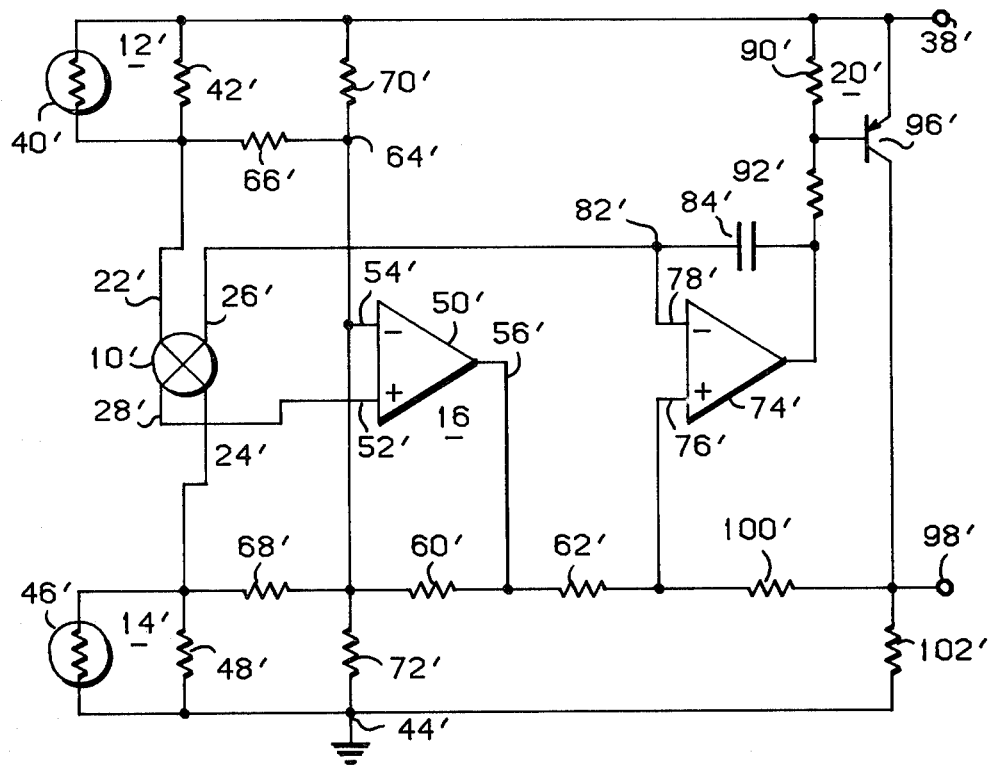
FIG. 2 is a schematic of a second embodiment of the invention.

FIG. 2 illustrates in schematic form a second embodiment of the invention. The circuit elements of the second embodiment are all designated by a prime number in order to simplify the following description and to indicate the similarity with the first embodiment. First and second temperature compensation networks 12' and 14' are connected as in the first embodiment to the pressure transducer 10', and resistors 66' and 68', respectively. However, negative output terminal 28' of pressure transducer 10' is connected to non-inverting input terminal 52' of operational amplifier 50'. Positive output terminal 26' is connected to node 82' and inverting input terminal 54' is connected to node 64'. Non-inverting input terminal 76' of second operational amplifier 74' is connected to node 65' between resistors 62' and 100'. The output of the second operational amplifier 74' is coupled to output stage 20' as described in the first embodiment.

Resistor 100' is trimmable for adjusting the gain of the circuit instead of transistor 62 of the first embodiment. The remaining elements designated by a prime number serve the same purpose as the respective elements of the first embodiment. Having positive and negative output terminals 26' and 28' connected in this manner requires a relative small current from pressure transducer 10', thereby reducing the dependence of gain on the pressure transducer 10' output resistance.

I claim:

1. A temperature compensation circuit having first and second supply voltage terminals, for temperature compensating an output voltage of a pressure sensor having first and second pressure sensor inputs, said circuit comprising:
   a first compensating network coupled between said first supply voltage terminal and said first pressure sensor input for providing a first signal that varies with temperature to said pressure sensor;
   a second compensating network coupled between said second supply voltage terminal and said second pressure sensor input for providing a second signal that varies with temperature to said pressure sensor; and
   circuit means coupled to said first and second compensating networks and said pressure sensor and responsive to said pressure sensor output voltage and said first and second signals, wherein the summation of said first and second signals substantially eliminates any voltage change due to a temperature change.

2. The circuit according to claim 1 wherein said first and second compensating network each comprise at least a thermistor.

3. The circuit according to claim 1 wherein said circuit means includes a first operational amplifier responsive to said pressure sensor output voltage for providing a first operational amplifier output which is summed with said first and second signal.

4. The circuit according to claim 3 wherein said circuit means further includes a second operational amplifier responsive to the summation of said first operational amplifier output and said first and second signal.

5. The circuit according to claim 1 wherein said circuit means includes a first operational amplifier responsive to said pressure sensor output voltage and said first and second signals for providing a first operational amplifier output which is summed with said first and second signals.

6. The circuit according to claim 5 wherein said circuit means further includes a second operational amplifier responsive to said pressure sensor output voltage and the summation of said first operational amplifier output and said first and second signals.

7. A circuit having first and second supply voltage terminals and a circuit output for reflecting pressure changes, said circuit comprising:
   a pressure transducer for providing a transducer voltage that varies with pressure and temperature;
   compensating means coupled to said first and second supply voltage terminals and said pressure transducer for providing a first and a second signal, said pressure transducer responsive to said first and second signals; and
   circuit means coupled to said pressure transducer and said compensating means and responsive to said transducer voltage and said first and second signals for providing said circuit output, said variation in transducer voltage due to temperature changes being substantially eliminated by the summation of said first and second signal and said transducer voltage.

8. The circuit according to claim 7 wherein said compensating means comprises:
a first compensating network including a first thermistor coupled to said first voltage terminal for providing said first signal; and
a second compensating network including a second thermistor coupled to said second voltage terminal for providing said second signal.

9. The circuit according to claim 7 wherein said circuit means includes a first operational amplifier responsive to said transducer voltage for providing a first operational amplifier output, wherein the summation of said first operational amplifier output and said first and second signals comprises said circuit output voltage.

10. The circuit according to claim 7 wherein said circuit means includes a first operational amplifier responsive to said transducer voltage and said first and second signals for providing a first operational amplifier output, wherein said first operational amplifier output is summed with said first and second signals.

* * * * *